Aug. 11, 1925.
M. C. INDAHL
1,549,256
PRINTER'S STRIP MAKING MECHANISM
Filed Oct. 28, 1924
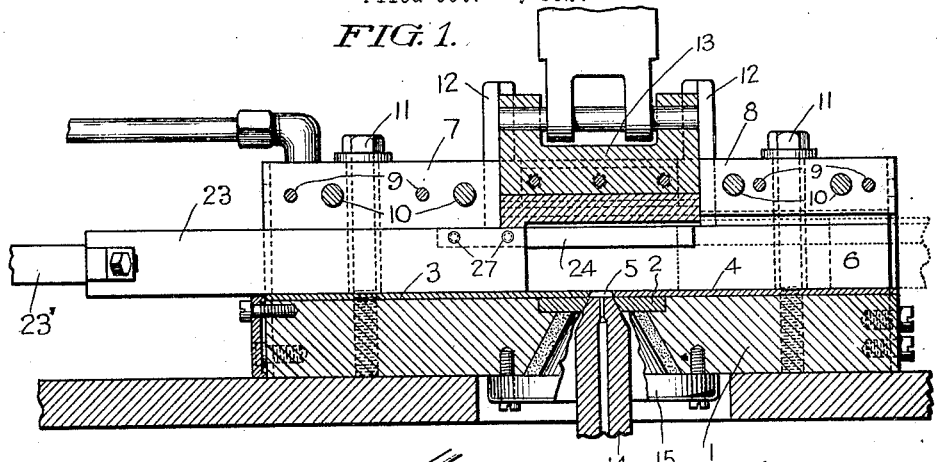
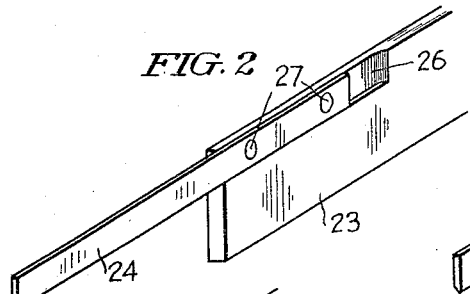
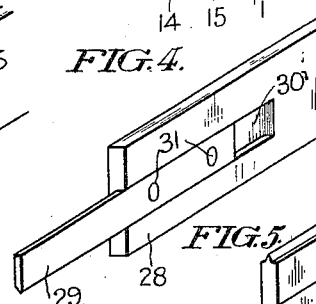
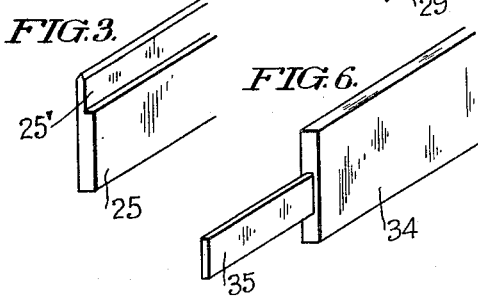
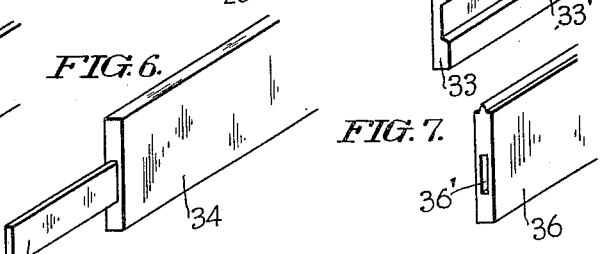
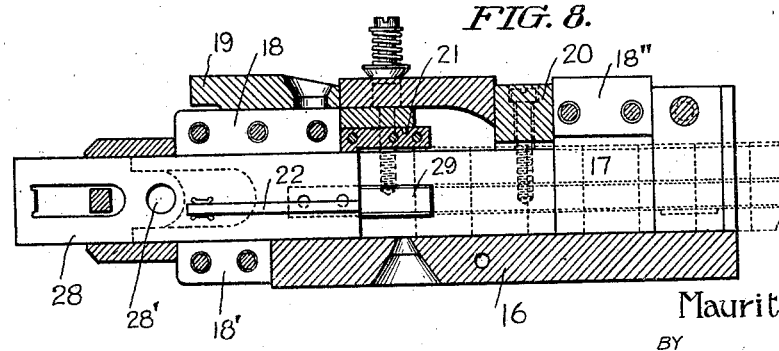
INVENTOR.
Mauritz C. Indahl,
BY John A. Ferguson
HIS ATTORNEY.

Patented Aug. 11, 1925.

1,549,256

UNITED STATES PATENT OFFICE.

MAURITZ C. INDAHL, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

PRINTER'S-STRIP-MAKING MECHANISM.

Application filed October 28, 1924. Serial No. 746,427.

*To all whom it may concern:*

Be it known that I, MAURITZ C. INDAHL, a citizen of the United States, and a resident of Philadelphia, county of Philadelphia, State of Pennsylvania, have invented certain new and useful Improvements in Printers'-Strip-Making Mechanism; and I do hereby declare the following to be a full, clear, and exact description of the same, reference being had to the accompanying drawings, forming part of this specification, and to the characters of reference marked thereon.

This invention relates to typographic casting machines particularly such as employ molds for producing printers' strip material, in which molds a blade is provided to dimension the mold cavity and thus determine the length of cast and to move the cast, after it has congealed, toward the exit of the mold. The main object of the invention is to provide a mold construction, particularly with reference to the mold blade, by which strip products may be cast with longitudinal hollows, nicks or grooves. Light, hollow strips may thus be produced such as, for example, newspaper head rules, having a side groove near the top and tie up slugs having a central side groove. Other objects and advantages will be hereinafter pointed out or will otherwise appear in connection with the following description of the embodiment of the invention illustrated in the accompanying drawings, in which Fig. 1 is a longitudinal section of a mold embodying the present invention.

Fig. 2 is a perspective view of the mold blade of Fig. 1.

Fig. 3 is a perspective view of a piece of strip material produced by the aid of the mold and mold blade of Figs. 1 and 2.

Fig. 4 is a perspective view of a modified mold blade.

Fig. 5 is a perspective view of a strip made by the aid of the mold blade of Fig. 4.

Fig. 6 is a perspective view of a further modified mold blade.

Fig. 7 is a perspective view of a strip produced by the aid of the mold blade of Fig. 6, and Fig. 8 is a longitudinal sectional view of a mold differing in construction from that of Fig. 1, and also embodying the present invention.

The mold illustrated in Fig. 1 is fully disclosed together with the necessary operating mechanism in application Serial No. 677,712, Indahl, filed November 30, 1923; while that illustrated in Fig. 8 is set forth in United States Letters Patent No. 1,222,415, issued to Knight, and dated April 10, 1917. It will not be necessary therefore to describe these molds and their operation in detail. The mold represented by Fig. 1 may be recognized as corresponding with the disclosure of the above mentioned application and may be identified, for example, as comprising the base plate 1, the nozzle plate 2, the lining plates 3, 4, the closure slide abutment 5, the rear type block 6, the point blocks 7, 8, the screws 9 for holding the type and point blocks together as a unit, the screws 10 for securing together the side blocks with the mold unit between them, and the screws 11 for securing the side blocks to the mold base 1. The matrix guide blocks 12 and the matrix 13 will also be recognized and the nozzle 14 and shield 15 are also shown in the drawing.

The mold illustrated in Fig. 8 will also be recognized as corresponding in general construction with that disclosed in the patent above mentioned. It may be identified by reference to the following parts: the base plate 16, the rear type or side block 17, the point blocks 18, 18′, 18″, the tie bars 19, 20, the matrix 21 and the gate pusher blade 22, movable with the mold blade and working in a gate channel provided in the front type or side block in a manner well understood. Both of the above identified molds may be employed to produce nonfusion strips or fused increment strips of indeterminate length as is well known. Both molds are provided with mold blades for dimensioning the mold cavity lengthwise and for pushing the cast forwardly toward the exit of the mold. It is, of course, understood that these molds are operated in conjunction with suitable mechanism including, among other devices, mechanism for moving the nozzle, for injecting molten type metal into the mold cavity and for moving the mold blade, all of these operations being in properly timed relation to each other, and to the other movements of the machine.

Aside from the mold blade construction the present invention contemplates no change in the mold. The mold blade, according to this invention has a body portion of suitable cross-sectional shape and of proper height and pointwise dimensions and of proper length to operate in the mold, whether that of Fig. 1 or that of Fig. 8, or any other suitable mold, and is provided with an extension portion projecting forwardly of the end of the mold blade, such extension being located within the mold cavity and consequently within the cross sectional boundaries of the mold blade body portion. The extension is of such length as to project across and beyond the mold cavity during the casting operation and is of an unvarying cross sectional form throughout its length, such form corresponding to that of the groove desired in the product.

Referring to the drawings, the blade 23, illustrated in Figs. 1 and 2, is provided with an extension 24 at its upper back surface to produce a strip with a groove along one side at the top thereof. This strip product 25 is illustrated in Fig. 3 and is of a form sometimes employed as a rule across the top of newspapers, the groove portion 25′ being utilized to hold suitably notched column rules. This product may be called a newspaper head rule. The blade and its extension are in effect integral but for ease of manufacture a groove 26 (Fig. 2) is cut in the blade 23 and the extension 24 is seated therein and then the two pieces are fastened together by rivets 27. The blade is operated by suitable mechanism cooperating in a well-known manner with the connection 23′ at the rear end of the blade.

The blade 28, illustrated in Figs. 4 and 8, is provided with a central side extension 29. This may be made by milling the groove 30 in the blade and securing the extension in place by rivets 31. The product 33 of this blade is shown in Fig. 5. If made with a matrix, such as 21, Fig. 8, a rule face 32 will be cast on the strip, the latter being provided with a central side groove 33″, such a product being known as a combined tie-up slug and rule; if cast with a blank matrix, particularly on a low mold, a tie-up slug will be produced. This blade is operated by suitable and well known mechanism connecting with the blade through the aperature 28′ therein.

In Fig. 6 a mold blade variation is illustrated in which the blade 34 is provided with an axial projection 35, the projection or extension being integral with the blade and being formed by cutting down all four sides and edges of the blade. The product made by this blade is shown in Fig. 7 and consists of a grooved strip 36, the grooved or the hollow portion 36′ thereof being within the confines of the body of the strip and extending axially thereof.

In Figs. 1 and 8, the product is shown in dotted lines within the mold. When, in making a cast, molten metal is injected through the nozzle into the mold cavity, it is molded or formed by the side walls, the mold base, the end of the section or increment previously cast and the mold blade, the end of the latter defining the rear wall of the cast and the extension portion of the blade modifying the cross sectional shape which would have been produced had the mold blade been unprovided with such extension. The extension projects a sufficient distance beyond the mold blade proper to pass through the mold cavity and enter into and plug the hollow or groove in the section previously cast. It must therefore have a definite minimum length, being at least as long as the length of the mold cavity or the length of stroke of the mold blade. This has been illustrated in Figs. 1 and 8 by the vertical dotted line in each figure defining the rear end of the strip previously cast and between which line and the mold blade end the mold cavity is defined. It will be observed that the extension of the blade passes beyond this cavity and overlaps the previous cast. In the casting of a section or increment, it being understood, of course, that these molds may be employed to produce non-fusion strips or fused increment strips of indeterminate length, molten metal is injected through the nozzle into the mold and fills the mold cavity, the cavity being a plain rectangular cavity in an ordinary, normal mold and being altered from its rectangular form by the mold blade extension as previously described. This metal fills the mold cavity fully and flows against the end wall of the previous cast and the end wall of the mold blade. When it has congealed sufficiently the mold blade is moved in a forward direction and the end wall thereof pushes the last cast and with it the preceding increments or sections toward the exit of the mold. The extension of the blade does not push the strip from the mold but moves with the strip occupying the groove which it has formed in the latter, there being no relative motion between the strip and the extension during the forward movement of the mold blade. Upon the retraction of the mold blade the extension moves relatively to the strip itself which is prevented from rearward motion by a friction device not shown, but provided in the normal construction of these molds. The extension thus breaks loose from the strip on the rearward motion of the blade and the blade takes up its dimensioning position before the extension has pulled out of the groove in the strip. The blade and extension are now in position for a succeeding cast and the movements described, as well as the other well-known and necessary operations inherent in the machine and mold are repeated. The extension may, if desired, be slightly tapered toward its end to facilitate its breaking loose from the strip.

It will be observed that the construction permits of the use of an ordinary mold, whether of the construction of Fig. 1 or of Fig. 8 or of any other suitable construction, to produce a special, groove product. A normal blade in the same mold will produce a normal or ungrooved product and the special product may be had by merely changing the normal blade for an extension blade, such as is shown in Figs. 2, 4 and 6. It is apparent that the capability of a normal mold to produce a special product is of considerable practical value, particularly when such production involves so simple a matter as the changing of a mold blade, it being remembered that heretofore each special grooved product required a specially constructed mold and a special blade to fit it.

I claim:

1. A mold for producing grooved printers' strip material comprising cavity forming side, top and bottom walls, a mold blade the end of which forms an end wall of the cavity, the opposite end wall thereof being formed by the product previously cast, an extension forming a part of the blade and projecting across and beyond the mold cavity during the casting operation to determine the cross sectional form of the cast to be made, means for introducing molten metal into the cavity and means for operating the mold blade.

2. A mold for producing grooved printers' strip material comprising cavity forming side, top and bottom walls, a mold blade the end of which forms an end wall of the cavity, the opposite end wall thereof being formed by the product previously cast, an extension secured to and movable with said blade, said extension having a cross sectional area less than and within the boundaries of that of the blade and corresponding to the shape of the groove desired in the product, said extension projecting across the mold cavity during the casting operation and into the groove of the product, means for introducing molten metal into the cavity and means for operating the mold blade.

3. A mold blade adapted for use in connection with printers' strip material molds comprising a body portion having the height and pointwise dimensions corresponding with the body of the strip to be cast, said blade being provided with an extension projecting forwardly of the end of said blade, said extension being within the cross sectional boundaries of the body portion and having a length greater than the operating stroke of the blade.

MAURITZ C. INDAHL.